(No Model.)
C. C. HANFORD.
ART OF MAKING MALT LIQUORS.
No. 382,155. Patented May 1, 1888.
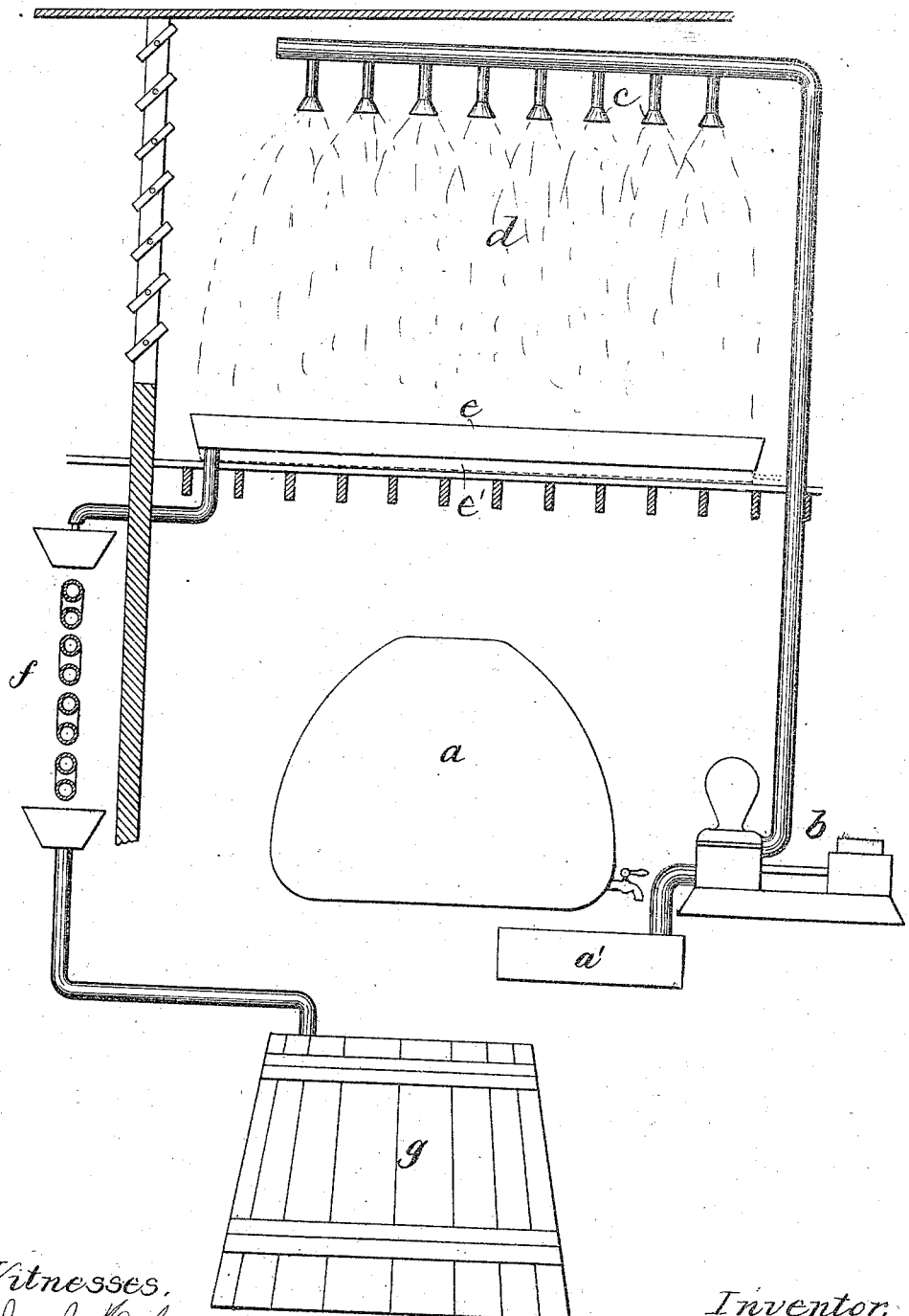
Witnesses.
Jas. J. Maloney
M. E. Hill
Inventor.
Clarence C. Hanford,
by Jos. P. Livermore,
Att'y.

UNITED STATES PATENT OFFICE.

CLARENCE C. HANFORD, OF MEDFORD, MASSACHUSETTS.

ART OF MAKING MALT LIQUORS.

SPECIFICATION forming part of Letters Patent No. 382,155, dated May 1, 1888.

Application filed September 15, 1887. Serial No. 249,755. (No specimens.) Patented in England November 16, 1886, No. 14,873, and in France March 23, 1887, No. 182,370.

*To all whom it may concern:*

Be it known that I, CLARENCE C. HANFORD, of Medford, county of Middlesex, State of Massachusetts, have invented an Improvement in the Art of Making Malt Liquors, (for which I have received Letters Patent in England, No. 14,873, dated November 16, 1886, and in France, No. 182,370, dated March 23, 1887,) of which the following description, in connection with the accompanying drawing, is a specification, like letters on the drawing representing like parts.

This invention relates to an improvement in the art of making malt liquors, by which a considerable saving in the cost of production is effected and the quality of the liquor improved.

In the process of making malt liquors as now generally practiced the wort or infusion of malt and hops is first boiled, and when properly boiled the infusion is removed from the boiler and fermented. The fermentation is carried on at a very low temperature, slightly above the freezing-point of water, and it is necessary that the infusion should be cooled as quickly as possible after it leaves the boiler or kettle, so that it may enter the fermenting-vats at a temperature of about 41° Fahrenheit, since for lager-beer, if it stands many hours in the heated condition, it rapidly deteriorates in quality. The fermentation will be quickened and the quality of the liquor improved by hot aeration or exposing the hot liquid to the action of the air as thoroughly as possible before it enters the fermenting-vats.

In the process of manufacturing as now generally carried on in breweries the hot infusion is pumped from the boiler into a large shallow vat or surface cooler or tub, where it is allowed to stand for a few hours exposed to the air, and cools, so that its temperature will be reduced 40° or 50° Fahrenheit below the boiling-point, and the liquor is sometimes more or less agitated while standing in the cooling-vat to give the different parts greater exposure to the atmosphere. The liquor is then taken from the cooling-vat at a temperature of from 160° to 175° Fahrenheit and caused to flow through a refrigerator or over a surface kept cool by iced water, so that its temperature is reduced to about 41° Fahrenheit, which is sufficiently low for it to enter the fermenting-vats.

The present invention relates especially to the cooling and aerating of the liquid after it is taken from the boiler and before it is received into the fermenting-vats, and by my process the liquor is far more thoroughly aerated and is cooled with a far smaller amount of ice than by the methods heretofore practiced.

The improved method consists, mainly, in forcing under pressure the hot liquor taken from the boiler through spraying tubes or nozzles, and thus dividing the liquor into minute particles or spray, which is permitted to fall a considerable distance through the air, sufficient to expose it thoroughly to the surrounding atmosphere. When practicable, a fall of fifteen to twenty feet through the air is desirable. The sprayed liquor after falling is collected upon a suitable receiving-surface or in an open receptacle, and if not sufficiently cooled the liquor is then passed over the usual refrigerators and has its temperature reduced to the proper point for entering the fermenting-vats. By this operation of breaking the liquor into fine spray and permitting it to fall through the atmosphere every particle of the liquid is thoroughly exposed to the air and a large amount of air is absorbed in the collected liquor, which renders the subsequent fermentation much more active and rapid, and in falling through the air the temperature of the liquor is reduced to about 120° Fahrenheit, more or less, according to the fineness of the spray and the amount of fall and condition of the atmosphere. This is 40° or 50° lower than the temperature of the liquor after it has stood in the open cooling-vat for two or three hours in the old process, and thus effects a saving of at least one-fourth and from that up to one-half the consumption of ice required by the old process, thus greatly reducing the cost of manufacturing the liquor.

In another application, Serial No. 269,462, filed April 3, 1888, by me, an apparatus is shown and described in detail for use in the manufacture of malt liquors in accordance with the herein-described method, and such application may be referred to for a detailed description of apparatus suitable for carrying out this method.

The drawing of the present application represents a sufficient portion of the apparatus used in breweries to illustrate the improved process.

The boiler or kettle in which the infusion is prepared is represented at $a$. The infusion when properly prepared is drawn from the boiler, usually into a tank, $a'$, and it is in accordance with this invention delivered under pressure by a suitable forcing apparatus represented by the pump $b$, and is broken up into a fine spray or mist by delivery under such pressure from suitable spraying-tubes, (represented at $c$.) The spray is then permitted to fall, as indicated at $d$, through the atmosphere for a proper distance, and is collected by a suitable receptacle, $e$, having a large surface area. The fall of the spray preferably takes place in a room properly prepared for this purpose, having open sides to admit the free circulation of atmospheric air, and the liquid is cooled and aerated in its passage through the air to the collector $e$. The cooled and aerated liquid may then, if necessary, be still further cooled by passing over the usual refrigerator, $f$, and it is then conveyed to the fermenting-vats $g$, and the subsequent processes are the same as in the method heretofore usually practiced, except that there is no occasion for any further aeration of the liquor, as is sometimes required in the old process. The liquor is so much cooled in falling through the atmosphere that it does not need to stand in the collector $e$, but flows at once over the refrigerator to the vats $g$, so that the liquor flows continuously from the boiler to the fermenting-vats as rapidly as it can be forced by the pump, thereby effecting a saving of all the time that it is allowed to stand in the surface cooler in the old process, thus enabling more brewings to be made in a given time with the same apparatus than by the old process.

In some cases it may be desirable to have the surface on which the spray falls chilled or kept cool by iced water or a cooling-mixture beneath the said surface, which may be made with a chamber below for such cooling material, as indicated in dotted lines at $e'$.

By this improved process of cooling and aerating the liquor by permitting it to fall through the atmosphere in the form of a spray and passing it continuously from the boiler to the fermenting-vats the fermentation is rendered much more active and the liquor produced is superior to that made by the process heretofore employed.

In actual tests of liquor made by this improved process the yeast is found to be much improved and the cells larger and fuller and nearly snow-white in color, and the herein-described process is found to bleach or lighten the color of the liquor produced by it.

It is found that beer made by the old process that has become dead or lost the power of fermenting will be made active and properly fermented by being mixed with a portion of the liquor that has been aerated while hot or in the process of cooling by the herein-described method.

I claim—

The herein described improvement in the art of making malt liquors, which consists in subjecting the hot infusion or wort taken from the boiler to pressure and delivering it under pressure to the atmosphere in the form of a fine spray, permitting the said spray to fall a considerable distance through the atmosphere, whereby the liquor is cooled and aerated, and subsequently collecting and fermenting the said liquor, substantially as described.

In testimony whereof I have signed my name to this specification in the presence of two subscribing witnesses.

CLARENCE C. HANFORD.

Witnesses:
   JOS. P. LIVERMORE,
   M. E. HILL.